United States Patent

[11] 3,601,638

[72] Inventor Claus A. Busse
       Laveno, Italy
[21] Appl. No. 710,252
[22] Filed Mar. 4, 1968
[45] Patented Aug. 24, 1971
[73] Assignee European Atomic Energy Community
       (Euratom)
       Brussels, Belgium
[32] Priority Apr. 9, 1967
[33]         Luxembourg
[31]         1899/67

[54] FUEL ELEMENTS FOR USE IN THERMIONIC NUCLEAR REACTORS
4 Claims, 7 Drawing Figs.

[52] U.S. Cl. .................................................. 310/4,
                                                165/105, 176/39
[51] Int. Cl. ........................................... H01j 45/00
[50] Field of Search ............................................ 310/4;
                                                176/39; 165/105

[56] References Cited
UNITED STATES PATENTS

| | | | |
|---|---|---|---|
| 3,234,412 | 2/1966 | Sankovich et al. | 310/4 |
| 3,243,613 | 3/1966 | Grover | 310/4 |
| 3,302,042 | 1/1967 | Grover et al. | 310/4 |
| 3,437,847 | 4/1969 | Raspet | 310/4 |
| 3,440,455 | 4/1969 | Stahl et al. | 310/4 |
| 3,453,455 | 7/1969 | Lanypape et al. | 310/4 |

FOREIGN PATENTS

| 1,421,323 | 11/1965 | France | 310/4 |
|---|---|---|---|

Primary Examiner—D. F. Duggan
Attorney—Stevens, Davis, Miller & Mosher

ABSTRACT: Disclosed are nuclear fuel heated thermionic converters. Heat pipes are provided to ensure isothermal heat transfer between the converters and the reactor.

FUEL ELEMENTS FOR USE IN THERMIONIC NUCLEAR REACTORS

The invention relates to fuel elements for use in thermionic nuclear reactors.

Thermionic nuclear reactors have often been suggested in the literature as energy sources for space vehicles. The reactor core is formed of fuel elements having thermionic converters heated by nuclear fuel.

The converters are connected in series by mutual contact and are disposed one after the other lengthwise of the elements. The construction is very compact and therefore advantageous from the nuclear aspect. However, it has the following disadvantages: the necessary electrical insulation of the collector causes an undesirable drop in temperature which makes it difficult to optimize collector cooling. Moreover, the combination of insulating layer and collector (herein called the collector sandwich) causes technological difficulties as regards the manufacture and force stressing of the insulation.

In practice, the fission gases from the nuclear fuel can be dissipated only via the electrode space, and this may contaminate the converter electrodes and the working fluid of the converters (e.g., cesium vapor or plasma). If the fission gases are allowed to escape to atmosphere through a ventilating hole in the fuel element can, corresponding cesium losses must be accepted. It is true that the losses can be reduced by making the ventilating holes narrow, but this step leads to the formation of high partial pressures in the fission gases. This increases electrode contamination and electrode corrosion and also to some extent impedes the electron flux. Low fission gas pressures can be achieved only by complicated cesium circulating and cleaning devices.

Lastly, once the emitters have been incorporated in the fuel element they are no longer accessible from outside; this more particularly makes it impossible to test the converters in the finished element by electrical heating of the emitters without fuel, although such testing is very desirable.

It is an object of the invention to provide a fuel element which does not have the aforementioned disadvantages or in which the disadvantages are reduced, but nevertheless enables a required minimum output (e.g., 10 kw.) to be produced in a complete assembly by electrical connection in series. In the invention use is made for purposes of heat dissipation of a so-called heat pipe, which in the simplest embodiment is a pipe closed at both ends which contains a quantum of working fluid. Heat is conveyed in the form of latent energy by the vaporization of the working fluid in a heating zone, and condensation in a cooling zone. The circuit is closed by the condensate flowing back to the vaporizing zone through a capillary structure with which the inside wall of the pipe is lined. This kind of cooling has already been suggested for thermionic converters or fuel elements.

The present invention relates to a fuel element with nuclear-heated thermionic converters having coaxial or plane-parallel emitter and collector electrodes, in conjunction with a heat pipe for dissipating the reaction heat.

In its broad form the invention provides a fuel element comprising a plurality of nuclear-heated thermionic converters in combination with a heat-dispersing heat pipe in which the converters are disposed one beside the other with the same transverse orientation to the heat pipe and are accessible at a sidewall of the pipe for electrical connection in parallel relation.

More specifically the element according to the invention is characterized in that the converters are disposed one beside the other with the same transverse orientation to the heat pipe, each emitter electrode taking the form of an electrical contact which bears, using electrical insulation, gastight against the outside of the heat pipe between the electrodes, while the collector electrodes are included in the vaporizing surfaces of the heat pipe wall which if necessary also forms the fuel element can.

For a coaxial electrode system, the emitters in the form of round rods are inserted into match cylindrical recesses in the heat pipe, which is in that case prismatic, or correspondingly in a solid collector block disposed therein, the emitter bases bearing via the insulation against the heat pipe, and forming the walls of the recesses in the collector electrodes. The emitter base is disposed by an insulating ring on the back of the heat pipe. With a flat electrode system, a wall of the heat pipe acts directly as a collector electrode, a plate-shaped emitter being retained thereabove at the required intermediate distance by the insulation on the same wall. In both cases the heat pipe also forms the body of the fuel element.

In the combination of converter and heat pipe according to the invention, and unlike the prior art, the axis of symmetry of the converters lies transversely of the main direction in which the fuel element extends. This affords important constructional and operational advantages. These advantages are shown more particularly in the construction of a reactor core from a number of fuel elements of the kind specified to form a fairly large output unit. In the first place, the collectors of the converters of each fuel element are electrically connected in parallel due to the fact that they are incorporated in the heat pipe—i.e., fuel element—wall. This eliminates the collector sandwich—i.e., the insulating layer between the fuel element envelope and the collector electrodes required with series connection. Electrodes of different potential (collectors and emitters) which might be short-circuited by the coolant are no longer disposed in the fuel element space acted on by the coolant, but the spaces between the electrodes terminate at the fuel element periphery.

In the second place, the emitter bases disposed outside the heat pipe take the form of electrical contacts. The emitter electrodes of the converters of a fuel element can therefore be electrically connected in parallel in a very simple manner by a second fuel element of the same kind being placed on (if the reactor core is to be layered horizontally) or placed against (if the reactor core is to be layered vertically), the first element. At the same time the converters of the fuel elements brought into contact with one another are thereby also connected electrically in series. The result is a very flexible constructional technique for thermionic reactor cores.

The heat pipes of the fuel elements of cores of the kind specified can be extended to emerge from the reactor fission zone and can, for instance, take the form of radiators for radiating off heat.

In the third place, the orientation of the emitter systems to the fuel element periphery enables the fission gases to be directly dissipated from the fuel element to the outside—e.g., to the free slots of the reactor core. The cesium-filled spaces between the electrodes are no longer affected.

Lastly, the peripheral orientation of the emitters enables the converters as yet without fuel to be given a test heating in a very simple manner, since the emitters are accessible from outside without opening the fuel element. This step also enables successive constructional and assembly operations to be checked, since any error can be detected and obviated before the next operation is performed. Moreover, defective converters can be interchanged relatively easily.

A description will now be given of the invention with reference to the embodiments of the fuel element and its components and also the associated electric circuit illustrated diagrammatically in the drawings, wherein.

Figure 1:
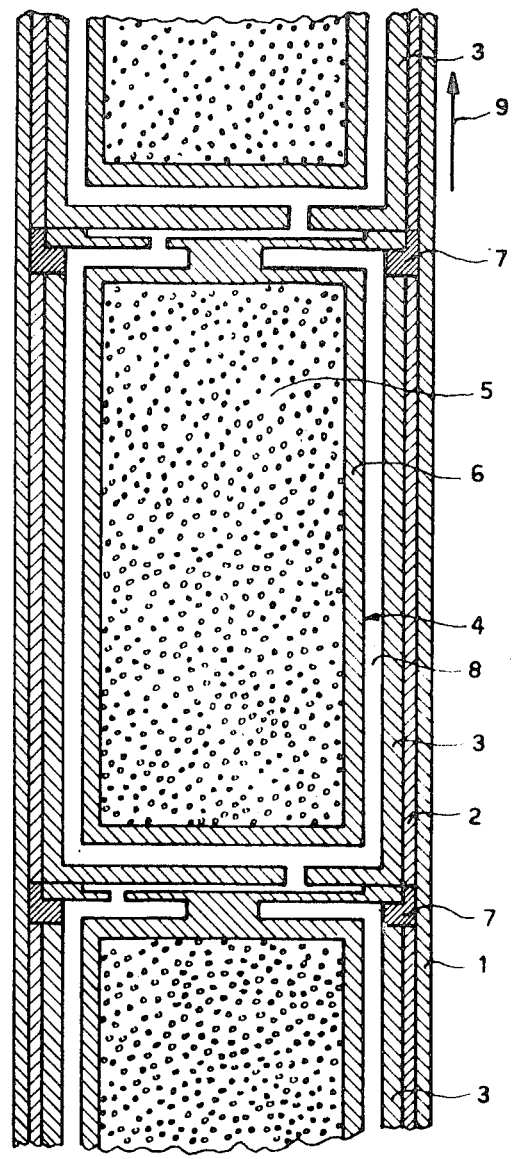
FIG. 1 is a longitudinal section through a portion of a prior art fuel element with series-connected thermionic converters.

In FIG. 1 an outer metal tube 1 (the fuel element can) encloses, coaxially arranged one after the other, an electrical insulating layer 2, and the converters with the collector electrodes 3 and the emitters 4, the latter containing nuclear fuel 5 in a metal envelope 6. The collector and emitter are kept separated by ceramic rings 7. Electrode space 8 contains cesium vapor. A coolant flows in the direction shown by the arrow 9 over the surface of the element.

Figure 2:
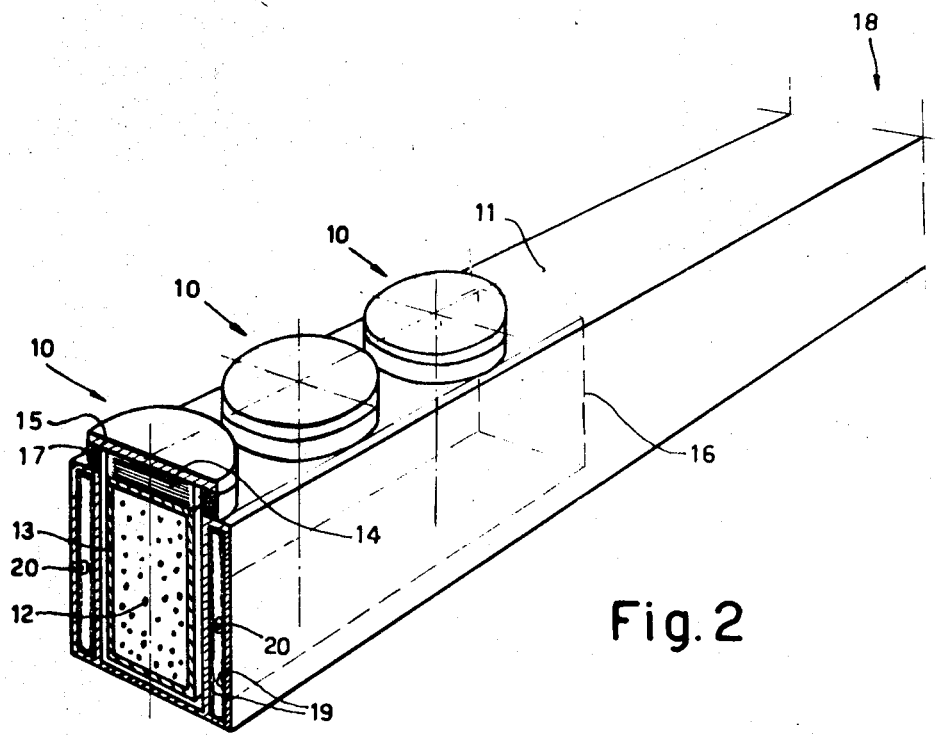
FIG. 2 is a sectioned perspective view of a novel fuel element, having thermionic converters connected in parallel and a coaxial electrode system, in a heat pipe acting as the element envelope.

Referring to the fuel element shown in FIG. 2, converters 10 are disposed one beside the other with the same transverse orientation in a heat pipe 11 of rectangular cross section. The converters comprise; an emitter system consisting of a nuclear fuel filling 12—e.g., $UO_2$—with an emitter envelope 13—e.g., Mo; a thermal screening 14—e.g., of Mo; and a cover 15— e.g., of Nb-1Zr; and a collector system comprising a solid block 16—e.g., of Nb-1Zr, which is formed with cylindrical passages corresponding to the size of the electrode spaces and the number of emitter systems used. The emitters are inserted in the passages. In the reactor the rear end of the block 16 bounds the fission zone.

The emitter base of each converter—i.e., the thermal screening 14 and the cover 15—bears against the outside of the heat pipe, through an electrically insulating ring 17—e.g., of $Al_2O_3$. The insulating ring is soldered gastight to both the cover 15 and the heat pipe 11. THe surface of the cover 15 also acts as an electrical contact. The vaporizing surface of the heat pipe 11 is mainly formed by the outer wall of the collector block 16. The working fluid used is, for instance, Na. The Na vapor flows during operation to the condensation end 18 of the pipe, where it is condensed and deposited, whereafter the condensate is conveyed back through a capillary structure 19 and an "artery" 20 to the vaporizing zone. The "artery" is a condensate-supplying channel of super capillary diameter. Like the capillary structure on the pipe inner wall, the wall of the artery is constructed of a fine wire fabric of Nb-1Zr, which is sintered fast to the wall. The walls of the collector block 16 associated with the heat pipe are also furnished with the capillary structure. The pipe itself is made, for instance, of Nb-1Zr. The electrode space of each converter contains cesium vapor in conventional manner.

The construction of the collectors in the form of the block 16 also results in their electrical connection in parallel. In contrast, the emitter electrodes are connected in parallel by connecting the emitter bases—e.g., the covers 15. The connection is effected by a second fuel element being placed by its bottom portion on a lower, first element. The required series connection of the converters is at the same time produced by placing the elements of top of one another. The terminal voltage of the converter is of the order of magnitude of 1 volt.

Figure 3:
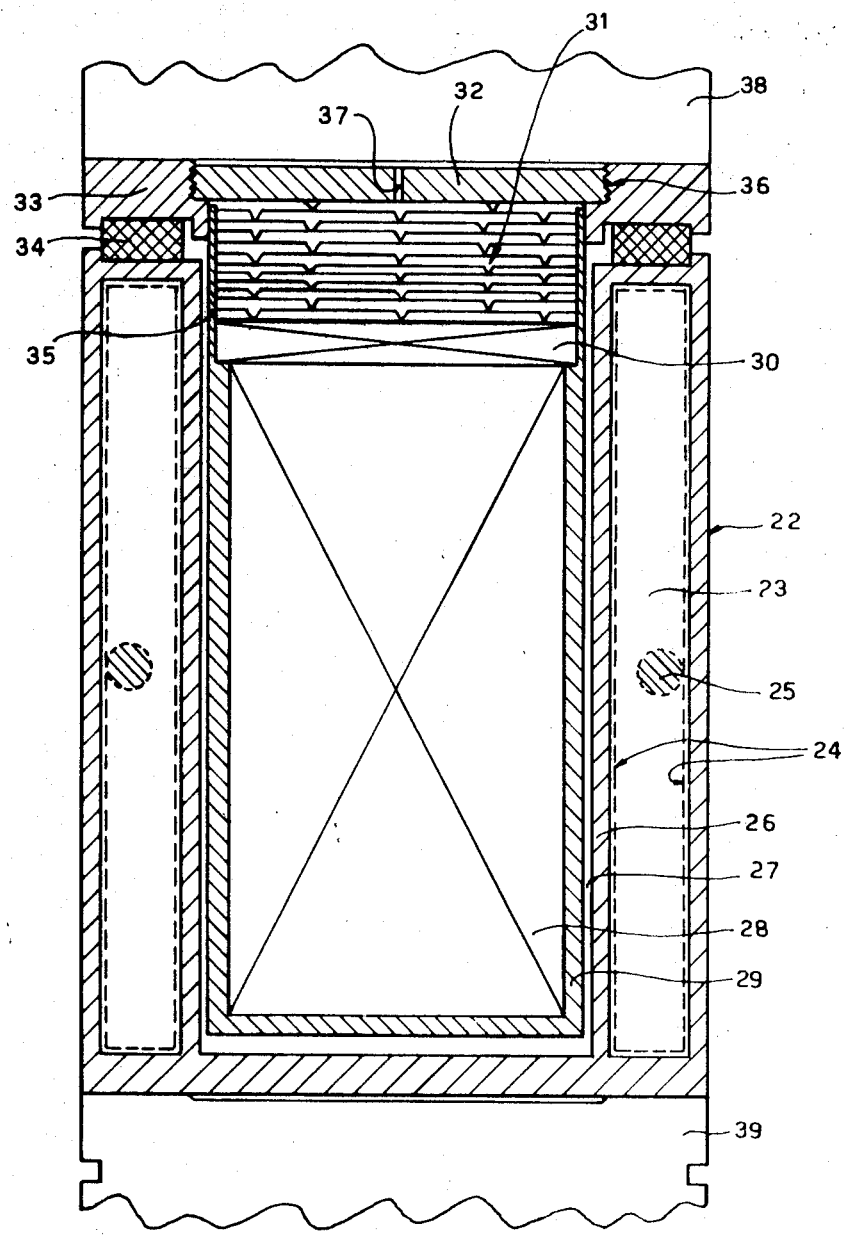
FIG. 3 is an enlarged and completed section through the fuel element, corresponding to FIG. 2.

FIG. 3 shows a method of attaching the emitter electrode with its base, and also the base to the heat pipe. The figure shows the heat pipe 22, its vapor chamber 23, a capillary structure 24, an "artery" 25 (filled with working fluid), a collector electrode 26 of Nb-1Zr with an internal sintered-on Mo layer, an electrode space 27, an emitter fuel filling 28 (enriched $UO_2$) an emitter envelope 29 of Mo or W, whose surface forms the emitter, a layer 30 of enriched $UO_2$, a thermal screening 31 in the form of a pack of molybdenum discs with supporting pips or bosses, a closure cover 32 for the emitter, a flange 33, and a ceramic ring 34 for the electrically insulating and gastight bearing of the emitter system against the heat pipe. The emitter envelope and the fuel form a solid cylindrical rod.

In detail, for reasons of heat expansion, the wall thickness of the upper neck portion 35 of the emitter envelope is considerably reduced (emitter temperature about 1,700° C.). At the top the neck portion 35 is soldered to the flange 33. The flange 33 and the closure cover 32 are screw threaded together at 36.

The molybdenum discs 31 of the thermal screening are kept apart by their pips. The cover 32 is also formed with a bore 37 through which the fission gases emerge to the outside. THe ceramic ring 34 is connected gastight by soldering to both the flange 33 and the heat pipe wall. In operation the temperature of the flange and the heat pipe wall is about 700° C. The contact between the bottom of the superimposed fuel element 38 and the flange 33 produces on the one hand the electrical connection in parallel of the emitters of the lower fuel element, and on the other hand the electrical connection in series of the converter systems of both elements. The same thing applies to the element 39 disposed below the element 38.

The construction of the emitter attachment illustrated in FIG. 3 also enables the emitter to be heated by electron bombardment for testing purposes before the nuclear fuel is inserted in the emitter envelope, since the emitter is accessible from outside.

Instead of a solid fuel rod, the emitter electrode can also be a rod with a hollow fuel filling. This has the advantage that the emitter can be electrically heated with the fuel incroporated.

While the foregoing describes a fuel element with thermionic converters and a coaxial electrode system, a description will now be given, with reference to FIG. 4, of a system with plane-parallel electrodes. A shallow rectangular heat pipe 40 with a capillary structure 41 and an "artery" 42 bears at its top on ceramic rings 43 a series of emitter electrodes 44 which contain nuclear fuel 45. As in FIG. 3, the emitter has at the top a thermal screening 46 and is closed by a cover formed with a fission gas hole 47. On their lower sides, the ceramic rings are soldered to the heat pipe, while each of their upper sides is soldered to a flange ring 48. The emitter is attached to the flange rings by an inserted collar 49 which in operation tends by thermal expansion to move the emitter upwards. The collar 49 also forms the equivalent of the heat insulation mentioned in connection with FIG. 3. The bottom of a second fuel element disposed on the flange rings 48 of the fuel element illustrated again produces the parallel connection of the emitters and the series connection of the converters.

Figure 4:
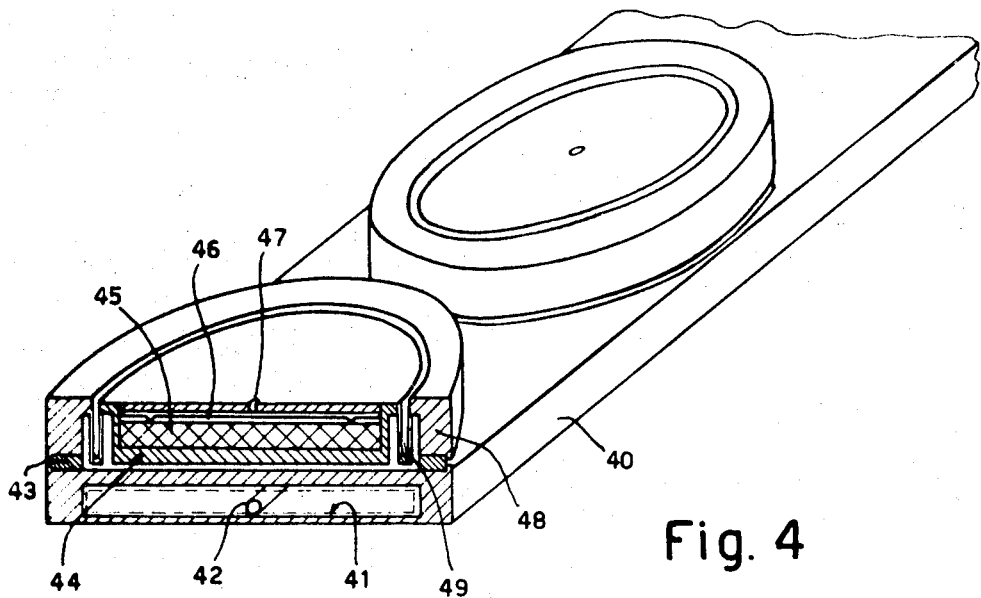
FIG. 4 is a sectioned perspective view of a novel fuel element, having thermionic converters connected in parallel and a plane-parallel electrode system, in a heat pipe acting as the element envelope.
Figure 5:
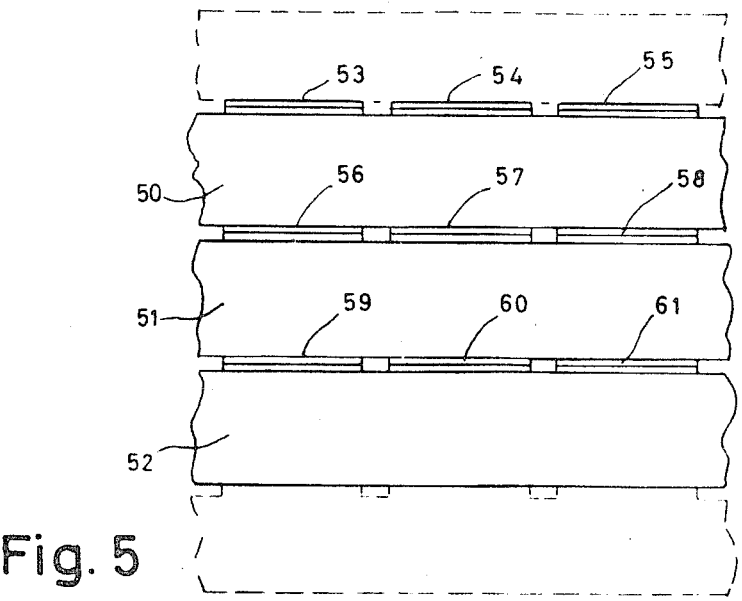
FIG. 5 is a lateral view of a single column stack of fuel elements as shown in FIG. 2 or FIG. 4.
Figure 6:
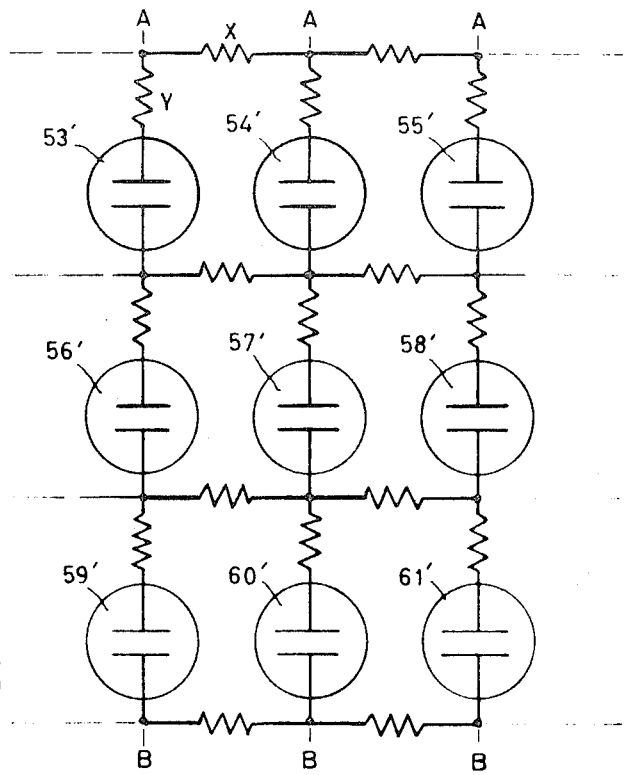
FIG. 6 is the electric circuit of the stack of elements shown in FIG. 5.

FIG. 5 is a diagrammatic side elevation of a single column stack of three superimposed fuel elements 50–52 of the kind shown in FIGS. 2 or 4, each having only three thermionic converters 53–55; 56–58; 59–61 for each element. FIG. 6 shows the electric circuit of the stack.

In FIG. 6 diodes 53'–61' symbolize the aforementioned nine converters. The resistances X, Y represent the electrical parallel and series connection resistances of the stack of elements. The resistance X is formed by the wall material of the heat pipe in the longitudinal direction of the fuel elements between two converters, while the resistance Y is substantially formed by the thin neck portion (cf. reference 35 in FIG. 3, and reference 49 in FIG. 4) of the particular emitter envelope of the converters. This produces electrically a bidimensional matrix. If the column of stacked fuel elements is connected electrically in series in a reactor core, that is to say, referring to FIG. 6, if the poles A of the matrix are connected to the poles B of a corresponding second matrix imagined to be disposed thereabove, and the same procedure is followed for all the other stacks, in its extended form the matrix shown in FIG. 6 can be taken as the circuit of the whole reactor core.

Figure 7:
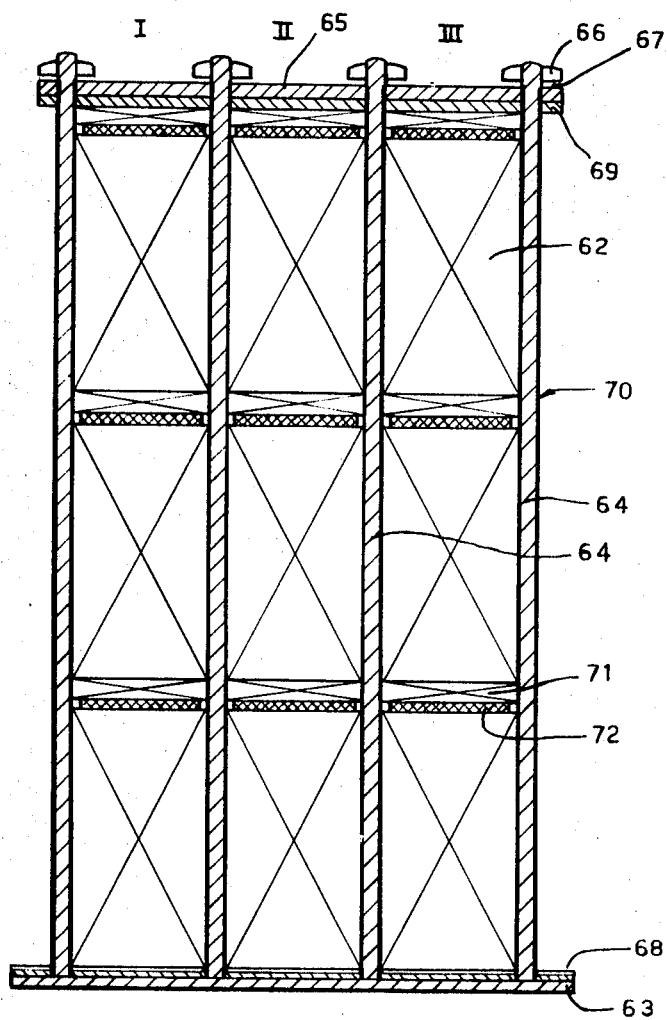
FIG. 7 is a front elevation of a nuclear reactor lattice formed from horizontally stacked fuel elements.

TO enable the fuel elements stacked up to form the reactor core to stay in place securely, and thereby ensure the required electrical contact pressure at all contact places of the matrix, at least at their top and base ends the fuel elements are mounted in clamping lattices which are rigid against rotation and force the fuel elements against one another. FIG. 7 shows an embodiment of a reactor core with clamping lattices and the fuel elements disposed lying down.

Referring to FIG. 7, fuel elements 62 are mounted at their front and rear ends (at the place where the active zone terminates; cf. in FIG. 2 the end of the block 15) in clamping lattices, only the front lattice being shown in FIG. 7. The lattice comprises a bottom plate 63, a clamping rod 64 and a cover plate 65. The cover plate 65 is forced by nuts 66 and spring washers 67 against the top layer of fuel elements so that all the elements of the three columns are brought under pressure and a reliable electrical contact is ensured.

If the columns are connected electrically in series, this being assumed in FIG. 7, the bottom and cover plates must have at least electrically insulating coating 68, 69 on the element side. In any case, the rods 64 have electrically insulating coatings 70, so as not to short circuit the layers of fuel elements. References 71 and 72 denote the insulating and flange rings of the emitters.

The serial connection of the column is, for instance, such that the common terminal of the emitters of the top fuel element in the column is connected to the end face of the bottom fuel element in column II, and the common terminal of the emitters of the top fuel element in column II is connected to the end face of the bottom fuel element in the column III. If the elements in the column are to be connected in parallel in layers, this can be done by end-face connecting members. Conveniently the whole reactor core is mounted on insulators in its container.

The fuel element according to the invention is not limited to the embodiments illustrated in the drawings, either as regards the cross section and shape of the heat pipe, or the shape and construction of the converter electrode system. For instance, the fuel element can alternately take the form of a flat circular box whose whole volume contains converters connected in parallel and therefore forms one whole layer of elements in a reactor core. The collector electrodes can comprise individual cylinders which are covered with wire fabric and are welded tightly into the heat pipes.

Moreover, the fuel elements can be borne inside the columns in some other manner than that described in the foregoing. For instance, each fuel element can be covered with an electrically insulating plate which is perforated in the zone of the emitter bases and is thicker than the height thereof. The bases can in that case bear at their tops a corrugated resilient contact bearing surface acting as an electrical friction contact against the bottom of the fuel element superimposed on the insulating plate.

The reactor core arrangement as illustrated in FIG. 7 has no moderator or reflector. For moderation and/or reflection purposes, suitable elements made of moderating or reflecting substances are placed in or on the lattice and cooled by a heat pipe. Alternatively, the fuel elements described hereinbefore can be furnished with moderating or reflecting layers, or else suitable electrically insulated moderator plates can be inserted in slots in the reactor core or placed on its outside.

I claim:

1. A nuclear fuel element comprising a plurality of nuclear-heated thermionic converters in combination with a heat propagating heat pipe win which the converters are disposed one beside the other with the same transverse orientation to the heat pipe and are accessible at a sidewall of the pipe for electrical connection in parallel relation.

2. A nuclear fuel element wit nuclear-heated thermionic converters in combination with a heat pipe for propagation of the reaction heat, the said converters being disposed one beside the other with the same transverse orientation to the heat pipe, each emitter electrode being supported via electrical interelectrode insulation means by the outside of the heat pipe wall, while the collector electrodes are included in the vaporization surfaces of the heat pipe wall.

3. A fuel element as claimed in claim 2 in which the electrodes of each converter are coaxial and the emitters in the form of rods are inserted into matching cylindrical recesses in a solid collector block disposed in the heat pipe, the emitter bases being supported via the insulation means by the heat pipe, and forming the walls of recesses in the collector electrodes.

4. A fuel element as claimed in claim 2, having a flat electrode system the collector electrode being integrated in the wall of the heat pipe and the plate-shaped emitter electrode being retained thereabove at the required intermediate distance by the insulation means on the same wall.